May 5, 1970 G. E. ROWE ET AL 3,510,288
GLASSWARE HANDLING APPARATUS FOR USE WITH A GLASSWARE
FORMING MACHINE TO DEPOSIT NEWLY FORMED
WARE ON A TAKE-AWAY CONVEYOR
Filed Feb. 8, 1967 3 Sheets-Sheet 1
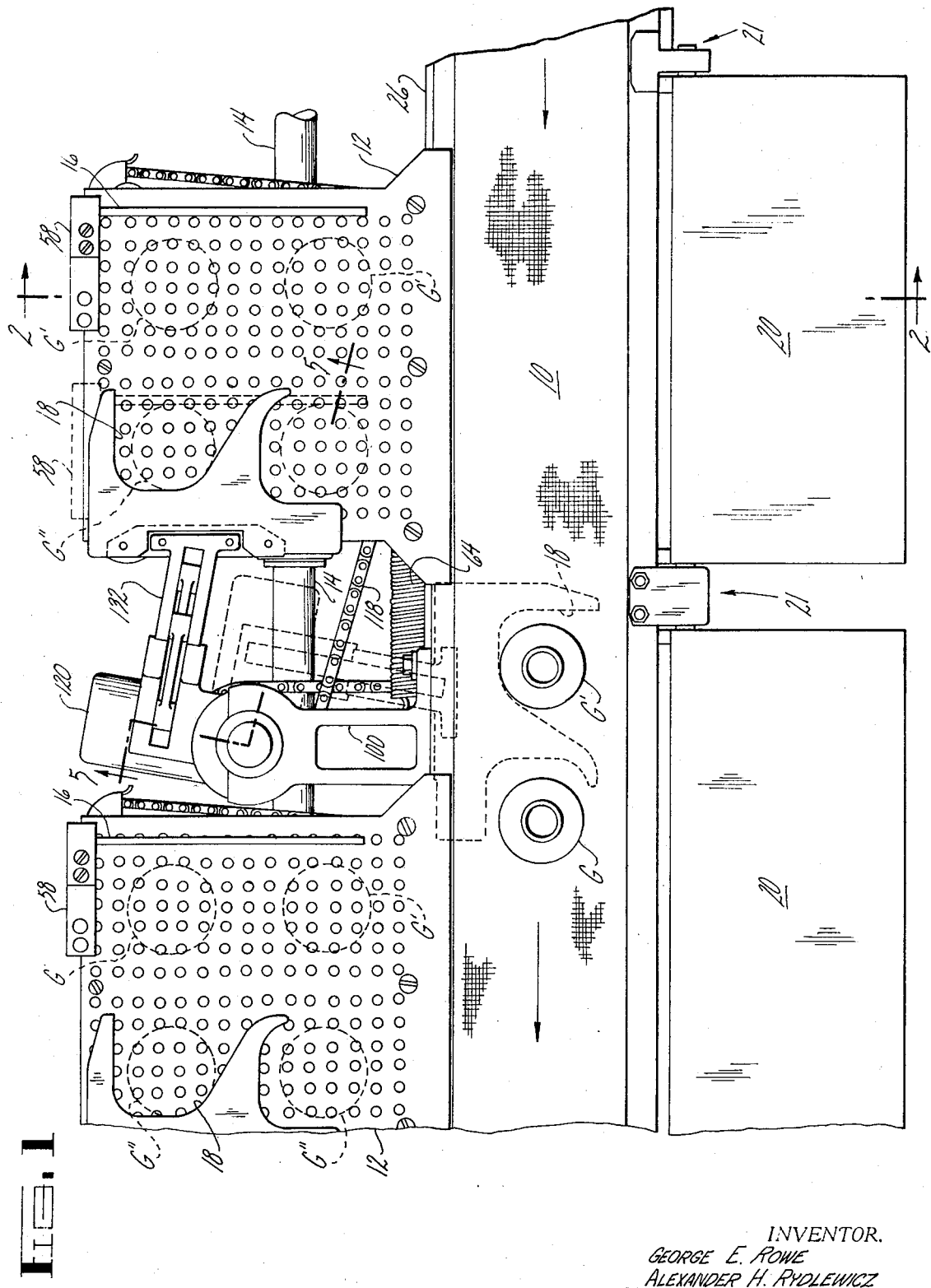
INVENTOR.
GEORGE E. ROWE
ALEXANDER H. RYDLEWICZ
BY
McCormick, Paulding & Huber
ATTORNEYS

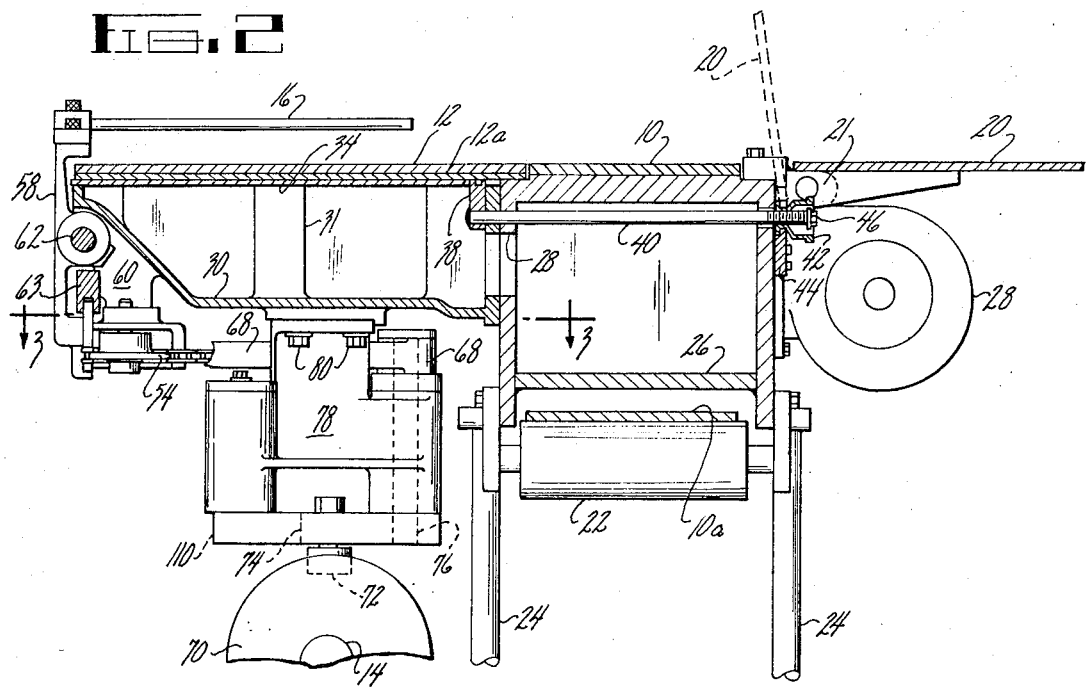
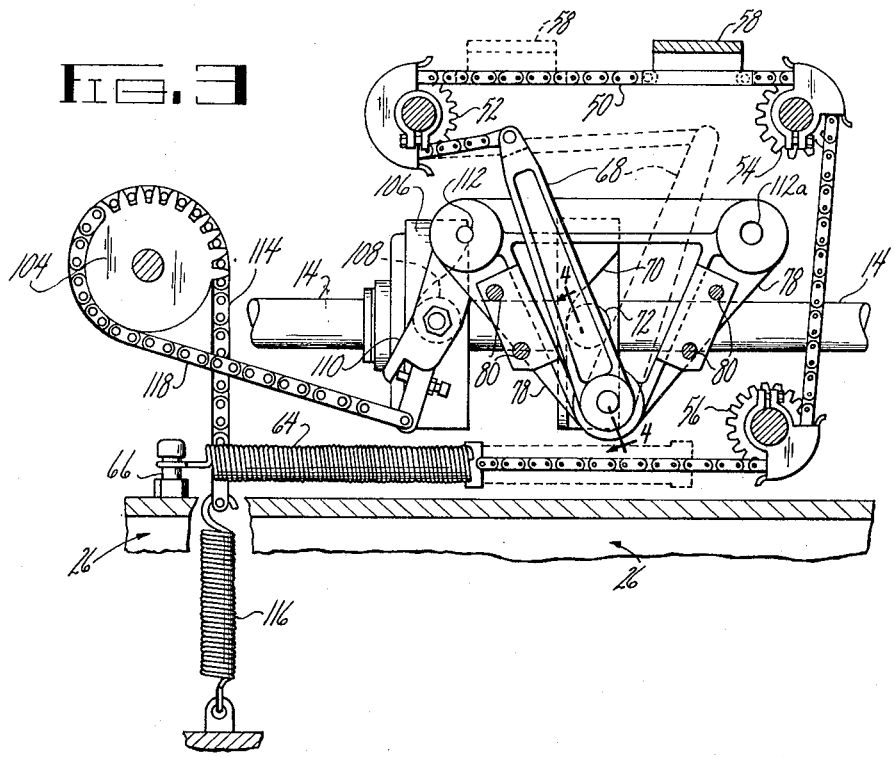

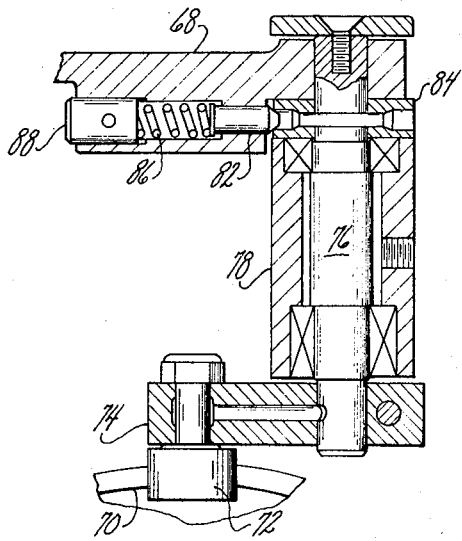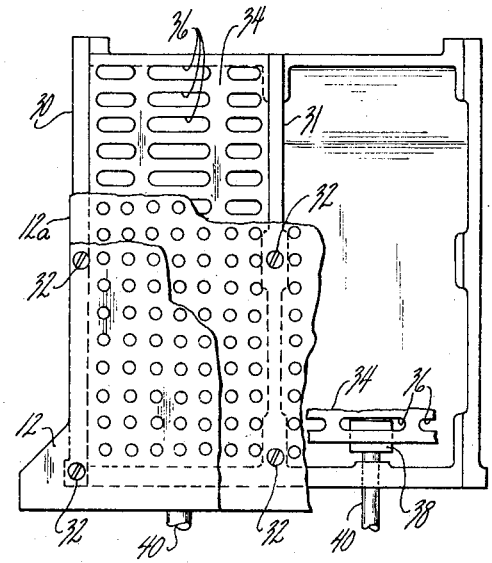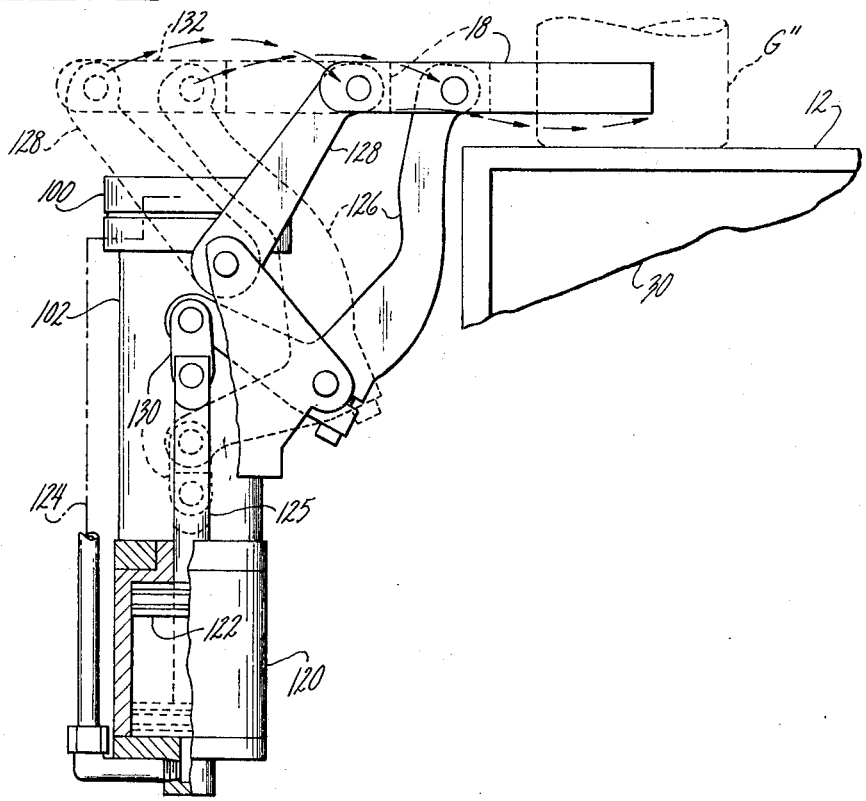

United States Patent Office 3,510,288
Patented May 5, 1970

3,510,288
GLASSWARE HANDLING APPARATUS FOR USE WITH A GLASSWARE FORMING MACHINE TO DEPOSIT NEWLY FORMED WARE ON A TAKE-AWAY CONVEYOR
George E. Rowe, Wethersfield, and Alexander H. Rydlewicz, Manchester, Conn., assignors to Emhart Corporation, Bloomfield, Conn., a corporation of Connecticut
Filed Feb. 8, 1967, Ser. No. 614,738
Int. Cl. C03b 35/00
U.S. Cl. 65—167
6 Claims

ABSTRACT OF THE DISCLOSURE

A ware handling apparatus including a perforated double deadplate, with a pressurized plenum chamber therebelow, is located adjacent a glassware forming machine section, and at the rear edge of a take-away conveyor so that newly formed ware can be received at a first deadplate station. A slide valve at the first station allows air under pressure to be exhausted through the perforated deadplate. A reciprocable bar extends across the deadplate and is movable to advance the ware from the first station to a second deadplate station where a second slide valve allows air from the plenum chamber to be directed onto the ware for further cooling. An oscillatable rotary pushout device moves the ware from the second station onto the take-away conveyor in timed relation with movement of the bar. A shelf is hingedly connected to the front edge of the take-away conveyor and serves to hold ware or a workman's tools when in its normal horizontal position, or functions as a heat shield when raised to its vertical position to permit a workman to make minor adjustments or repairs to the machine section without shutting down the entire machine.

BACKGROUND OF INVENTION

This invention relates to an apparatus for handling newly formed glassware, and deals more particularly with an improved apparatus for cooling the newly formed ware and for moving the ware onto a take-away conveyor for delivery to another machine, such as an annealing lehr.

Ware handling apparatus for moving newly formed ware along a deadplate and onto an adjacent conveyor are shown in Pat. Nos. 2,677,919 and 2,556,469 issued to Worrest and Dahms respectively. These patents disclose pushers for moving the ware from a first cooling station to a second cooling station on a double deadplate and additional pushers which move toward and away from the conveyor for feeding the ware from said second station onto said conveyor. A more recent Pat. No. 3,249,200 issued to Rowe, shows an improved rotary pusher for advancing the ware along the conveyor as it is fed onto said conveyor, thereby avoiding the abrupt acceleration of the ware by said take-away conveyor characteristic of the earlier constructions. A U.S. Pat. No. 3,400,802, issued Sept. 10, 1968, and assigned to the assignee herein, depicts the preferred rotary pusher construction adopted in the combination disclosed herein. Not only have the earlier constructions of Worrest and Dahms been improved upon to provide a more efficient conveyor for the double deadplate, but the rotary pusher construction adopted herein has been found to possess particular advantages when used with a double deadplate. That is, the novel pusher construction adopted herein can be adapted for either left or right-hand delivery of ware from a double deadplate without substitution of parts.

SUMMARY OF INVENTION

The combination described and claimed herein includes a double deadplate construction in which a single plenum chamber is fitted with two slide valves which regulate exhaust air for cooling newly formed ware at two distinct deadplate stations. Novel means is provided for moving the ware from one station to the other, and for sweeping the ware onto an adjacent take-away conveyor. Additionally, a shelf is provided opposite the deadplate at the front edge of the conveyor, which shelf is movable to a vertical position for use as a shield to protect a workman from the heat given off by the ware on the take-away conveyor.

The general object of the present invention is to provide an apparatus for handling newly formed ware wherein two slide valves permit separate regulation of cooling air flow at two distinct deadplate stations, and wherein the newly formed ware is moved across the deadplate by a more efficient mechanism than is taught by the prior art.

A more specific object is to provide an apparatus of the foregoing character wherein a hinged shelf is provided opposite the deadplate for use as either a shelf or a head shield.

Another specific object is to provide an apparatus of the foregoing character which is especially well suited for use with a rotary ware push-out device of the type which accelerates the ware to a speed approximating that of the take-away conveyor.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

BRIEF DESCRIPTION OF DRAWINGS

FIG. 1 is a plan view of a ware handling apparatus provided according to the invention.

FIG. 2 is a vertical sectional view generally along the line 2—2 of FIG. 1.

FIG. 3 is a horizontal sectional view taken along the line 3—3 of FIG. 2 showing the drive for the apparatus of this invention.

FIG. 4 is a vertical sectional view taken along the line 4—4 of FIG. 3 showing a detail of the drive mechanism.

FIG. 5 is a vertical sectional view taken along the line 5—5 of FIG. 1 showing details of the rotary pusher.

FIG. 6 is a plan view of one of the double deadplates shown in FIG. 1 with portions broken away to reveal the slide valve construction associated with each of its two stations.

DETAILED DESCRIPTION

Turning now to the drawings in greater detail, FIG. 1 shows a take-away conveyor 10 which is continuously driven in the direction of the arrow by suitable means (not shown) for delivering newly formed articles of glassware G, G to an annealing lehr or the like. The take-away conveyor 10 is normally provided at the front, or blow mold side, of a conventional Hartford I.S. Machine having a plurality of sections (not shown) each of which includes a suitable take-out mechanism for depositing newly formed glassware on a horizontally disposed double deadplate 12 supported at the rear edge of the conveyor 10 and located intermediate said conveyor and the glassware forming machine section. More particularly, the deadplate 12 shown is adapted for "double gob" machine operation to receive two articles of newly formed ware at a first station or zone as indicated at G', G'.

A camshaft 14 is driven by the glassware forming machine and carries suitable cams to be described hereinbelow for movement of a pusher bar 16 between the positions shown in solid and broken lines to move the newly formed ware to a second deadplate station or zone indicated generally at G", G". The said camshaft also operates a rotary pusher element 18 to sweep the newly formed ware from said second station onto the continuously moving take-away conveyor 10 as indicated by the solid and broken line positions of the element 18. Still with reference to FIG. 1, a hinged shelf 20 is provided at the front edge of the take-away conveyor 10 generally opposite to each of the deadplates 12, 12 for the convenience of a workman to store surplus ware and tools.

Turning now to FIG. 2, the generally rectangular shelf 20 can be seen to be hingedly connected to the forward edge of the fixed frame of the conveyor 10 so as to be movable from the position shown in FIG. 1 to a raised position as indicated by the broken lines wherein the shelf serves as a heat shield to protect the workman from heat given off by the relatively hot newly formed ware on the conveyor 10.

Still with reference to FIG. 2, the conveyor 10 will be seen to comprise a continuous belt with an upper run which carries the newly formed ware G, G in the direction of the arrow of FIG. 1, and a lower, or return run indicated generally at 10a, which rides on suitable rollers 22 rotatably supported in the fixed frame of the conveyor. The conveyor is free-standing having legs 24, 24 which support a generally rectangular elongated box beam 26 which has upper and lower walls as shown as well as continuous side walls so that its interior can be supplied with cooling air.

In accordance with the present invention, each deadplate 12 comprises a hollow housing 30 attached to the rear side wall of the box beam 26 and having an opening which communicates with a correspondingly arranged opening in said rear side wall as indicated at 28. The hollow deadplate housing 30 is relatively shallow as shown in FIG. 2 and includes a tapered rear wall to provide space for the chain and sprocket mechanism to be described which operates the transverse pusher 16. The housing 30 defines a plenum chamber which can be pressurized with cooling air from the interior of the conveyor support frame or box beam 26, and the upper wall of the housing 30 is defined by the horizontally disposed perforated deadplate 12 shown to best advantage in FIG. 6. More particularly, the deadplate 12 comprises a top plate which may be of asbestos or the like and defines a plurality of circular openings as shown. A coextensive metal plate 12a, which is also perforated, is provided beneath the upper, ware-receiving plate, as shown. Both said plates 12 and 12a are permanently attached to the housing walls by a plurality of screws 32, 32. The housing 30 further includes a T-shaped reinforcing rib 31 extending forwardly from the tapered rear wall of said housing to the front wall thereof as best shown in FIG. 2.

A pair of slide valvse 34, 34 are slidable in the housing immediately below the steel plate 12a, and means to be described is provided at the front of the conveyor for limited fore and aft movement of each of them. Each slide valve 34 defines a plurality of slots 36, 36 each of which is alignable with sets of the circular openings defined in the fixed deadplates 12 and 12a so as to direct jets of cooling air upwardly and outwardly from the plenum chamber defined in the housing 30. Preferably, and as shown, the means for operation of said slide valves 34, 34 comprises a generally U-shaped block 38 having upstanding legs for engaging the rearwardly facing side edge of a slot 36 in the slide valve and the forwardly facing edge of the slide valve itself so that movement of the block 38 in the forward or rearward direction respectively causes corresponding movement of the slide valve with respect to the housing 30. Means is also provided for so moving each of the slide valves from in front of the conveyor structure 10, and as shown, said means comprises a rod 40 fixedly attached at one end to each block 38 and extending forwardly through openings in both the front and rear side walls of the conveyor frame 26 as best shown in FIG. 2. The forward end of the rod 40 is threaded into a knob 42, which is restrained against movement relative to the fixed frame of the conveyor by a guide plate 44 so that rotation of the knob 42 causes fore and aft movement of the rod 40. An adjusting screw 46 is provided in the end of the threaded portion of the shaft 40 for adjusting the lineal travel of said shaft and consequently of the associated slide valve 34.

It is noted that the slide valves 34, 34 need only be provided with enough travel so that each moves a distance corresponding to the diameter of the circular openings in the deadplates 12 and 12a. As so constructed, a single plenum chamber defined by the deadplate housing 30 can be used to achieve the desired air flow cooling requirements at the two distinct deadplate stations associated with each of the slide valves 34, and 34.

Considering next the mechanisms for moving the transverse pusher bar 16 across the deadplate 12 so as to advance ware from the first station G' to the second deadplate section G", FIG. 3 shows a chain 50 entrained over three sprockets 52, 54 and 56 and carrying a slide block 58 to which the rearmost end of the pusher bar 16 is attached as best shown in FIG. 2. Each of the sprockets, as for example the sprocket 54 of FIG. 2, is rotatably supported in a depending bracket such as that shown at 60, comprising an integral part of the deadplate housing 30. The slide block 58 is slidably received on fixed guidebars 62 and 63 which guidebars are mounted on the depending bracket 60 as shown. As so arranged, the slide block 58 together with the pusher bar 16 is restrained to transverse movement generally parallel to the direction of movement of the conveyor 10 in response to linear movement of the chain 50.

With further reference to FIG. 3, one end of the chain 50 is connected to a tension spring 64, which is connected to the frame of the conveyor as indicated at 66. The opposite end of the chain 50 is connected to the free end of a horizonally disposed lever 68, which is movable between the positions shown in full and broken lines in response to rotation of a cam 70 carried by the camshaft 14. A cam follower 72 is mounted below the deadplate structure on a cam follower lever 74, which is carried at the lower end of a vertical rock shaft 76 rotatably supported in a casting 78 as best shown in FIG. 2. The upper end of the vertical rock shaft 76 carries the horizontally disposed lever 68 so that pivotal movement of the relatively short cam follower lever 74 causes corresponding pivotal movement of the longer lever 68.

The casting 78 is fixedly attached to the underside of the deadplate housing 30 by a plurality of screws 80, 80 best shown in FIG. 2. The casting 78 is so constructed as to provide a second journal for a second cam associated lever 110 which is adapted to oscillate the rotary push-out device in a manner to be described in greater detail hereinbelow. FIG. 4 shows in greater detail the portion of the casting journalling the shaft 76, and also shows the inner pivoted end of the lever 68 as including suitable means for allowing slippage between said lever 68 and the shaft 76 whenever glassware or other objects become jammed on the deadplate 12. As shown in FIG. 4 the means permitting slippage includes a spring loaded plunger 82 adapted to engage a detent recess defined in a collar 84 on the rock shaft 76 so that normally angular movement of the shaft 76 is transmitted directly to the lever 68. However, when the lever 68 is restrained, as by the jamming referred to hereinabove, the plunger 82 will be seen to slip from its detent and overcome the bias of the spring 86 so as to permit rotation of the collar 84 without corresponding movement of the lever 68. The force exerted by the spring 86 on the plunger 82 can be varied by rotation of an adjustment screw 88. As so constructed, rotation of the camshaft 14 causes linear travel of the slide block 58 in timed relation with the deposit of newly formed ware at the first station, or zone, on the deadplate 12.

Turning now to the rotary pusher 18 for sweeping the newly formed ware from the second deadplate station G" onto the continuously moving take-away conveyor as indicated at G, G it is noted that this device is fully shown and described in the above-mentioned copending application of Rowe. As described in the above-mentioned application, the rotary push-out device comprises a fixed bracket 100 (FIG. 1) mounted adjacent the rear edge of the conveyor 10 for rotatably supporting a base 102 (FIG. 5).

The base 102 is oscillatable through a substantial angle, preferably on the order of 90°, by a sprocket structure 104 (FIG. 3) so that the pusher element 18 of the rotary push-out device can be moved from the position shown in solid lines in FIG. 1 to that shown in broken lines. Still with reference to FIG. 3, it will be seen that a second cam 106 carried by the camshaft 14 causes movement of a cam follower 108, which cam follower is in turn carried by the second lever 110, which lever is pivotally supported in the casting 78 for movement about an axis defined at 112. The free end of the second lever 110 carries a chain 118 which is entrained on the sprocket 104 to achieve the desired oscillation of the base 102. The cam follower 108 is maintained in contact with the cam 106 by a second chain 114 secured at one end to the base 102 and entrained on the sprocket structure 104 with its other end connected to a return spring 116.

Suitable means is also provided for retracting the rotary pusher element after it has moved ware onto the conveyor 10 and for extending the said element over the deadplate to engage more ware. This means includes a vertically arranged reciprocatory pneumatic motor 120 mounted on the rotary base 102 and connected to the pusher 18 by a linkage system as described in the above-mentioned Rowe application. Air under pressure is supplied to one or the other side of the motor piston 122 for automatically extending the ware-engaging element 18 when the base faces the deadplate, and for automatically retracting said element when the base faces the conveyor. As shown in FIG. 5, one of two pressure lines is indicated schematically at 124 for providing air under pressure to the lower face of the piston 122 to extend the ware-engaging element 18. A similar line (not shown) is provided for delivering air under pressure to the upper face of the piston 122, and each of said pressure lines may serve to vent the interior of the air motor 120 through a one-way check valve associated with each line.

The linkage connecting the reciprocable piston rod 125 of the air motor 120 to the ware-engaging pusher element 18 preferably comprises first and second levers 126 and 128 each of which is pivotally connected to the rotatable base 102 at one of its respective ends and to the ware-engaging element 18 at its upper ends. Each of the levers 126 and 128 is generally vertically disposed as shown in FIGS. 1 and 5 with the shorter lever 128 being mounted generally above the longer lever 126 so that the entire linkage mechanism occupies a minimum of space.

The longer lever 126, is connected to the upper end of the piston rod 125 through a connecting link 130 so that the lever 126 is pivoted from the position shown in full lines in FIG. 5 to that shown in broken lines in response to extension of the piston rod. Still with reference to FIG. 5, it will be seen that the pusher element 18, and more particularly the stem portion thereof indicated generally at 132, comprises the third bar of a three-bar linkage with the projecting ware-engaging portion thereof constrained to follow an arcuate movement characterized by a dipping motion as indicated by the arrows of that figure as the pusher is extended. It reverses direction on the path indicated by the arrows during retraction, and this path substantially reduces the likelihood of toppling the ware on the conveyor.

With reference to FIG. 1, it will be seen that the rotary push-out device is intended for active operation in a clockwise direction so as to feed newly formed articles of glassware onto the continuously moving conveyor 10 running from right to left. In order to adapt the rotary push-out device described hereinabove for use with a conveyor running in the opposite direction, the bracket 100 would be mounted to the right side of its associated deadplate and it is a feature of the present invention that the casting 78 also includes a second, or alternate journal 112a as shown in FIG. 3, for pivotally supporting the second lever 110 in the event that the rotary push-out device is to be rigged for use with a conveyor moving in the opposite direction from that shown in FIG. 1.

It will also be apparent that the pusher 16 associated with moving ware from the first to the second deadplate station can also be arranged for moving ware in an opposite direction across its associated deadplate. This can be done by relocating the bracket 58 for the pusher 16 on the chain 50 and by rotatably adjusting the position of the cam 70 on the camshaft 14.

It can be seen therefore that the ware handling apparatus described herein not only offers a structurally simpler and more compact construction than has been available heretofore, but also offers the required flexibility of design to permit the various components to be used with slight reassembly for either left or right-hand delivery.

The invention claimed is:

1. Apparatus for use with a glassware forming machine of the type having a plurality of sections arranged alongside a continuously moving take-away conveyor, said apparatus comprising a deadplate associated with each section for receiving the newly formed ware, each deadplate having two side-by-side zones for cooling the newly formed ware, a camshaft driven by the machine, a ware engaging bar above said deadplate, a first cam on said camshaft, a fixed support bracket below said deadplate, a vertically disposed rock shaft journalled in said support bracket, a cam follower lever mounted to the lower end of said rock shaft, a cam follower on said lever, a first lever mounted to the upper end of said rock shaft for movement between first and second positions in response to movement of said cam follower, a chain with one end connected to said first lever, sprockets at the corners of said deadplate for receiving said chain, biasing means for the other end of said chain, and a slide block mounted to said chain for linear movement along the rear edge of said deadplate between said two sprockets, said ware engaging bar being carried by said slide block to move the ware from one zone to the second, and means for sweeping the ware from said second deadplate zone onto said take-away conveyor.

2. Apparatus according to claim 1 wherein said ware sweeping means includes a second cam on said camshaft, a second lever and cam follower thereon, a base oscillatable on a fixed vertical axis and carrying a ware engaging pusher element for sweeping the ware off said second deadplate zone onto said conveyor, said support bracket having two spaced bearings for selectively receiving said second cam follower lever in one of two possible positions corresponding to the direction of movement of said take-away conveyor with respect to the deadplate.

3. Apparatus according to claim 2 wherein said support bracket is of generally triangular configuration with the vertical rock shaft journalled at one apex thereof in generally centered relationship under the deadplate and adjacent the take-away conveyor, and with journals for pivotally receiving the second cam follower at its other two apexes oriented respectively outside of the limits of the angular travel of said first lever.

4. Apparatus according to claim 2 wherein said deadplate comprises a perforated fixed plate, housing means cooperating with said plate to define a single plenum chamber therebelow, a source of cooling air under pressure for said chamber, a pair of perforated slide valve plates adjacent the underside of said fixed plate to provide variable cooling at each of said deadplate zones, and manually operable means accessible from the front edge of the take-away conveyor for positioning said slide valve plates independently of one another.

5. Apparatus according to claim 4 wherein said source of cooling air includes an elongated duct having a top wall which supports the upper run of said take-away conveyor, said deadplate plenum chamber communicating with the hollow interior of said duct.

6. Apparatus according to claim 5 further characterized by a normally horizontal shelf hingedly connected to a longitudinally extending edge of said duct, said shelf having a longitudinal extent approximately equal to that of said deadplate so that said shelf serves as a heat shield when moved to a vertical position.

References Cited
UNITED STATES PATENTS

| | | | |
|---|---|---|---|
| 2,182,167 | 12/1939 | Berthold | 65—348 |
| 2,660,831 | 12/1953 | Rowe | 65—348 X |
| 2,677,919 | 5/1954 | Worrest | 65—348 |
| 3,374,078 | 3/1968 | Wright | 65—182 X |

ARTHUR D. KELLOGG, Primary Examiner

U.S. Cl. X.R.

65—348, 351